United States Patent [19]

Aoyagi et al.

[11] Patent Number: 4,829,498
[45] Date of Patent: May 9, 1989

[54] LIMITED DURATION FOCUSING IN A VEHICULAR DISK PLAYER

[75] Inventors: Yoshio Aoyagi; Toshiyuki Kimura; Yoshinori Saito, all of Saitama, Japan

[73] Assignee: Pioneer Electronic Corporation, Tokyo, Japan

[21] Appl. No.: 46,487

[22] Filed: May 6, 1987

[30] Foreign Application Priority Data

May 6, 1986 [JP] Japan .................................. 61-103508
May 6, 1986 [JP] Japan .................................. 61-103509

[51] Int. Cl.⁴ .............................................. G11B 7/00
[52] U.S. Cl. ........................................ 369/45; 369/53; 250/201
[58] Field of Search ..................................... 369/43–47, 369/53, 54, 58; 358/342; 250/201 DF

[56] References Cited

U.S. PATENT DOCUMENTS 4,497,049 1/1985 d'Arc .................................... 369/50

Primary Examiner—Robert L. Richardson
Attorney, Agent, or Firm—Sughrue, Mion, Zinn, Macpeak, and Seas

[57] ABSTRACT

A disk player particularly useful for vehicles in which a disappearance of a focusing condition during playback is detected. Thereafter, a series of repeated focusing operations of fixed, limited duration are performed until either focusing is achieved or the number of focusing operations reaches a first number. If the preset number is reached, playing ceases. Between the repeated focusing operations, disk instructions may be entered with a restart of the refocusing procedure.

5 Claims, 10 Drawing Sheets

LIMITED DURATION FOCUSING IN A VEHICULAR DISK PLAYER

BACKGROUND OF THE INVENTION

The present invention relates to a vehicular disk player equipped with an optical pickup.

In a vehicular disk player, its optical pickup may be out of focus because of vibrations created while a motor vehicle travels on a rough road. In such a case, it has been so arranged in a conventional player that the focusing operation is sequentially repeated until the pickup is brought into focus. In consequence, starting current is caused to flow through a focus actuator continuously and the problem is that the pickup becomes hot.

SUMMARY OF THE INVENTION

The present invention is intended to solve the aforesaid problem and it is therefore an object of the invention to provide a vehicular disk player whose pickup is prevented from over heating by limiting the number of times that focusing operation is repeated.

In the vehicular disk player according to the present invention, the focus is judged NG (no good) unless a lock-in signal is generated within the time specified after the commencement of the focusing operation and a counter is employed to count the number of occurrences of NG focus state. Thereby a stop mode is established when the number of NG focus state occurrences thus counted by the counter reaches a predetermined value, whereas the value thus counted by the counter is cleared when disk eject or stop instructions are given during the focusing operation.

DETAILED DESCRIPTION OF THE INVENTION

Referring now to the accompanying drawings, an embodiment of the present invention will subsequently be described.

Figure 1:
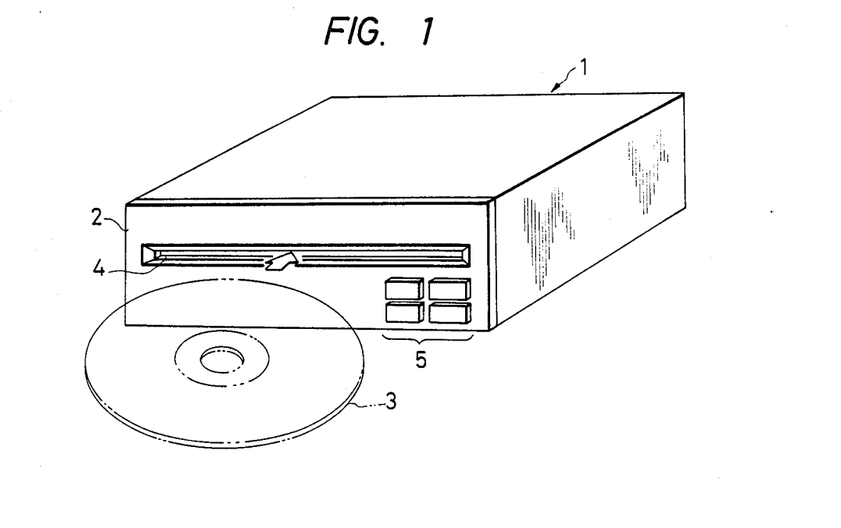
FIG. 1 is a schematic perspective exterior view of a vehicular auto-loading disk player embodying the present invention.
Figure 2:
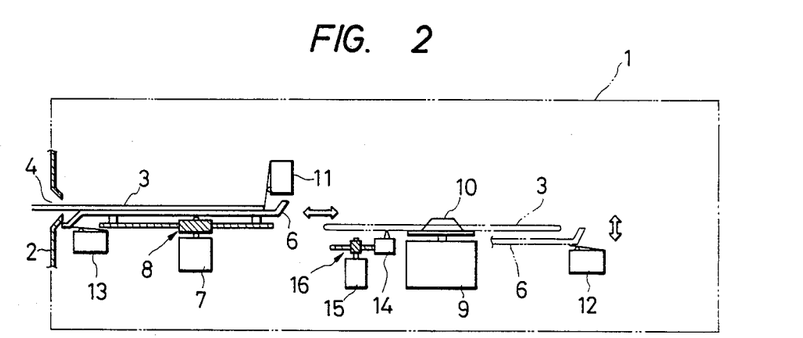
FIG. 2 is a schematic view of the internal construction thereof.

FIG. 1 is a schematic perspective exterior view of a slot-in type vehicular auto-loading disk player to which the present invention is applied. FIG. 2 is a schematic view of the internal construction thereof. As shown in FIG. 1, a disk 3 to be replayed is inserted through a slot 4. The slot 4 is bored in the transverse direction of a front panel 2 forming part of a housing 1. The disk 3 is, e.g., a compact disk for storing audio information which has undergone PCM (Pulse Code Modulation), the outer diameter of the compact disk being about 12 cm. Moreover, a plurality of operating keys for giving various operating instructions to the disk player, e.g., PLAY START, DISK EJECT instructions and so forth are disposed on the front panel 2 so that these keys constitute a group of operating keys 5.

In FIG. 2, the disk 3 inserted through the slot 4 is placed in position (slot position) on a tray 6 by positioning means (not shown) and loaded onto the tray 6 in such a state that part of the disk 3 protrude out from the front panel 2. A loading mechanism is constituted by the tray 6, a loading motor 7 as a driving source and a driving force transmission mechanism 8 for transmitting the torque of the motor 7 to the tray 6 in the form of transverse and vertical linear driving force. The loading mechanism carries the disk thus loaded between the slot position and a playback position in the housing 1 as described later.

In such a loading mechanism, the tray 6 loaded with the disk 3 set in the slot position is moved from a position shown by a continuous line to the right-hand side in FIG. 2 and is lowered at the point of time the center hole of the disk 3 arrives on a turntable attached to the rotary shaft of a spindle motor 9. The tray 6 is further lowered after the disk 3 is mounted on the turntable 10 and stopped in such a state that it is slightly separated from the disk face as shown by an alternate long and two short dashes line. The disk 3 is thus loaded through the sequential operation of the tray 6. The position where the disk 3 is mounted on the turntable becomes the aforesaid playback position. The disk 3 eject operation is conducted in a similar manner but opposite in order to the loading operation by means of the reverse rotation of the loading motor 7. Because Japanese Patent Application Nos. 200145-200153/84 filed by the present applicants disclose the aforesaid loading mechanism, a detailed description of the construction and operation thereof will be omitted.

There are installed various detection switches in the housing 1. A disk detection switch 11 detests whether or not the disk 3 is set in the slot position. The disk detection switch 11 is turned on when the disk 3 is set in the slot position and turned off when the disk 3 is removed from that position. A switch 12 for detecting the completion of loading is turned on when it mates with the tray 6 which has mounted the disk 3 on the turntable 10 and is used to detect the completion of the loading operation. Another switch 13 for detecting the completion of ejection is turned on when it mates with the tray 6 which has reached the frontmost position (on the side of the front panel 2) during the eject operation of the loading mechanism and is used to detect the completion of the eject operation.

The disk 3 mounted on the turntable 10 is turned and driven by the spindle motor 9 and the data recorded thereon is read out by an optical pickup 14. The pickup 14 is carried by a carriage (not shown) which is movable in the radial direction of the disk 3 and the carriage is driven by a carriage motor 15 through a gear mechanism 16. A signal produced by each of the group of operating keys 5 disposed on the front panel 2 and the aforesaid detection switches 11-13 is transmitted to a control system arranged in a proper position of the housing 1 as shown in FIG. 3.

Figure 3:
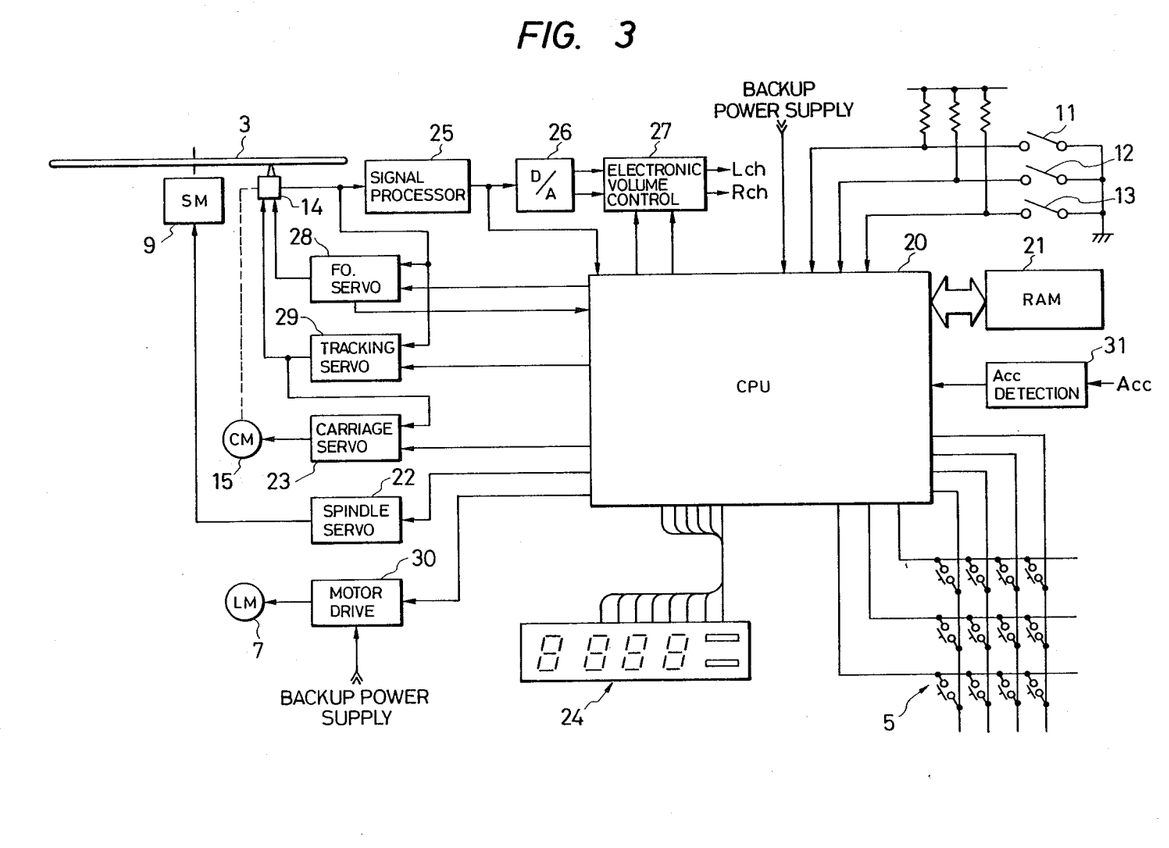
FIG. 3 is a block diagram showing the circuit configuration of a control system.

FIG. 3 shows a control system configuration including CPU (Central Processing Unit) 20 as the control center and a microcomputer and using a RAM (Random Access Memory) 21 as storage means, etc. Based on the signal produced by each of the group of operating keys 5 and the detection switches, the CPU 20 sends a control signal at a timing as described later to a spindle servo circuit 22 for controlling the speed of the spindle motor 9, a carriage servo circuit 23 for controlling the speed of the carriage motor 15 and a drive circuit 30 for driving the loading motor 7. The CPU 20 also supplies display data to a display unit 24 for making various displays.

The data read out by the pickup 14 from the disk 3 is demodulated by a signal processing circuit 25 for processing the signals in such a manner as to correct errors. The signals thus corrected are supplied to the CPU 20, converted by a D/A (digital/analog) converter 26 into analog data and then outputted as audio signals for left (L) and right (R) channels through an electronic volume circuit 27. The control system further includes a focus servo circuit 28 for controlling the position of the focused point of data reading spots transmitted out of the pickup 14 and focused on the recording face of the disk 3 in the direction perpendicular to the aforesaid recording face. A tracking servo circuit 29 controls the position of the data reading spots in the adial direction of the disk 3 relative to the recording tracks of the disk 3.

The focus servo circuit 28 responds to the instructions given by the CPU 20; controls the focusing operation of the pickup 14 when it is out of focus at the time of the commencement of or during playback; and, during normal playback, drives and controls an actuator (not shown) contained in the pickup 14 based on the focus error signal generated under a known detection method such as the astigmatism one. The focus servo circuit 28 further applies a lock-in signal to the CPU 20 when the lock-in state is present at the time of the lead-in of the focus servo. On the other hand, based on the instructions given by the CPU 20 at the time of jumping, the tracking servo circuit 29 supplies a drive signal to a tracking actuator (not shown) contained in the pickup 14. The tracking servo circuit 29 controls the position of the data reading point in the radial direction of the disk 3 by supplying the tracking error signal generated by a known detection method such as the three-beam one. The tracking error signal is also supplied to the carriage servo circuit 23 and its low frequency component is used as the carriage motor drive signal at the time of normal playback.

Since this disk player is intended for use in a vehicle, the CPU 20 is operated by a backup power supply, whereas each mechanism is operated by a main power supply actuated when the so-called accessory switch (not shown) of a motor vehicle is turned on. However, of the aforesaid mechanisms, only the loading mechanism including the loading motor 7 and its drive circuit 30 is operated by the backup power supply so that the disk 3 taken in the housing 1 may be ejected even when the main power supply is turned off. There is also installed an Acc detection circuit 31 for detecting the cut-off state of the main power supply (determined usually by the main key switch of the car) and supplying the detection signal to the CPU 20 when the main power supply is cut off. The Acc detection circuit 31 can simply be a voltage threshold circuit, powered by the backup power, and monitoring the voltage on the power bus which is switched by the accessory power switch.

Figure 4:
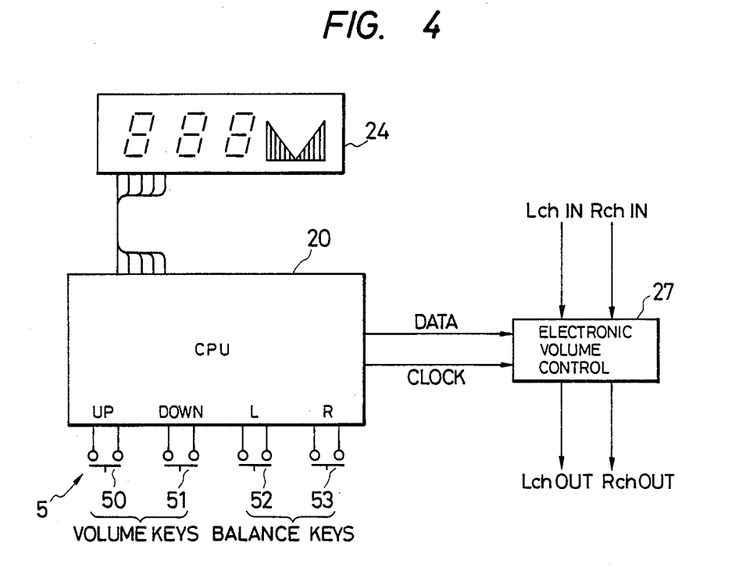
FIG. 4 is a block diagram showing the concrete partial circuit configuration of FIG. 3.

The group of operating keys 5 includes, as shown in FIG. 4, a volume [UP] key 50, a volume [DOWN] key 51 for respectively instructing increase (UP) and decrease (DOWN) in sound volume, a balance [L] key 52 and a balance [R] key 53 for balancing the sound volume in channels on the left- and right-hand sides. When those keys are operated, the programs are executed by the CPU 20. More specifically, the CPU 20 sends out data and a clock signal to the electronic volume circuit 27 to simultaneously increase or decrease the sound volume in both channels on the left- and right-hand sides when the volume [UP] key 50 or volume [DOWN] key 51 is operated. When the balance [L] key 52 or balance [R] key 53 is operated, the CPU 20 sends out data and a clock signal to the electronic volume circuit 27 to increase the sound volume in one channel and to decrease the sound volume in the other. The details of the processing method will be described later. Changes in the sound volume are displayed on the display unit. As an electronic volume circuit 27 of the sort aforementioned, use can be made of what has a known arrangement of, for example, a plurality of resistors connected in series and a plurality of analog switches connected in parallel to the resistors respectively and used to control sound volume by turning on and off the plurality of analog switches in response to data from the CPU 20.

The volume [UP] key 50 and the volume [DOWN] key 51 so function as to issue instructions concerning the increase and decrease of the aforesaid sound volume. When both of the volume keys 50 and 51 are doubly operated, they give instructions for reducing the sound volume by, for example, 20 dB at once.

Subsequently, referring to flowcharts shown in FIGS. 6 through 12, procedures for the operation of the aforesaid auto-loading disk player by means of the CPU 20 will briefly be described in playback order.

In accordance with a flowchart of FIG. 6, a series of operations including loading, play and ejection will be described. When the disk 3 is inserted into the housing 1 through the slot 4 and set in the slot position on the tray 6 as shown in FIG. 2, the disk detection switch 11 is turned on. When the CPU 20 detects the ON state of the disk detection switch 11 (STEP 1), it gives loading instructions to the loading motor 7 through the motor drive circuit 30. The loading motor 7 then turns and causes the loading mechanism to start, whereby the loading operation is started (STEP 2). When the tray 6 loaded with the disk 3 is moved from the position shown by the continuous line of FIG. 2 to the right-hand side and led to the upper part of the turntable 10, it is lowered directly from that position to mount the disk 3 on the turntable 10 as shown by the alternate long and short dashes line. The loading operation is completed through the series of the aforesaid operations. Then the switch 12 for detecting the completion of loading is turned on. When CPU 20 detects the completion of loading through the ON output of the switch 12 (STEP 3), the focus mode for bringing the pickup 14 into focus (focusing) (STEP 4) is established. The focus mode will be described later.

When the focus is completed in the focus mode, the pickup 14 is caused to start the reading operation. However, prior to reading the program area, the pickup 14 starts reading the data recorded in the lead-in area of the disk 3 (STEP 5) and thereafter moves to the play mode (STEP 7) through the display mode (STEP 6). The TOC (Table of Contents) data thus read out are stored in the RAM 21. The TOC data is recorded in the lead-in area of the disk 3, including the number of pieces, the total absolute time, the length of time required for each piece, etc. and the pickup 14 must read the TOC data always before playback. In the play mode, selection of music, scanning and searching in addition to playback are conducted in normal sequential order.

When the carriage (not shown) carrying the pickup 14 arrives at its marginal moving position upon the completion of playback, with a detection switch (not shown) being turned on, the CPU 20 detects the termination of playback at that point of time (STEP 8) and issues the eject instructions to the loading motor 7 through the motor drive circuit 30. The loading motor 7 is consequently caused to turn counter to the direction at the time of loading, so that the eject operation is started (STEP 9). During the eject operation, the tray 6 is operated in a manner similar to but opposite in order from the loading process so as to eject the disk 3 from the playback to the slot position. When the tray 6 reaches the frontmost position shown in FIG. 2, thus allowing the eject operation to be completed, the switch 13 for detecting the completion of ejection is turned on.

When the CPU 20 detects the completion of the eject operation from the ON output of the switch 13 (STEP 10), it subsequently judges the presence or absence of reload instructions given through the operation of the group of operating keys 5 (STEP 11) and, when the reload instructions exist, again issues the loading instructions to the loading motor 7 through the motor drive circuit 30 to make the loading operation start (STEP 12). On detecting the completion of the loading operation (STEP 13), because the same disk 3 is used for playback again and because the TOC data stored in the RAM 21 still remains valid, the CPU 20 assumes control over the pickup 14 without reading the TOC data so that the play mode may instantly be established (STEP 7).

When the reload instructions are judged absent after the completion of the eject operation, it is examined whether or not the disk 3 has been pulled out from the slot position (STEP 14). The extraction of the disk 3 can be detected from the OFF output of the disk detection switch 11. At the point of time in STEP 14 that it is certain that the disk 3 has been pulled out, the TOC data stored in the RAM 21 is invalidated (STEP 15) and an invalidation flag is raised. The series of operations including the loading, playback and inject is thus terminated.

In the aforesaid series of operations, the TOC data stored in the RAM 21 is not invalidated at the point of time the operation of ejecting the disk 3 is completed but only after the disk 3 is pulled out from the slot position. Therefore, when the disk 3 thus ejected is immediately replayed, the playback operation is smoothly conducted since no TOC data needs re-reading.

Figure 7:
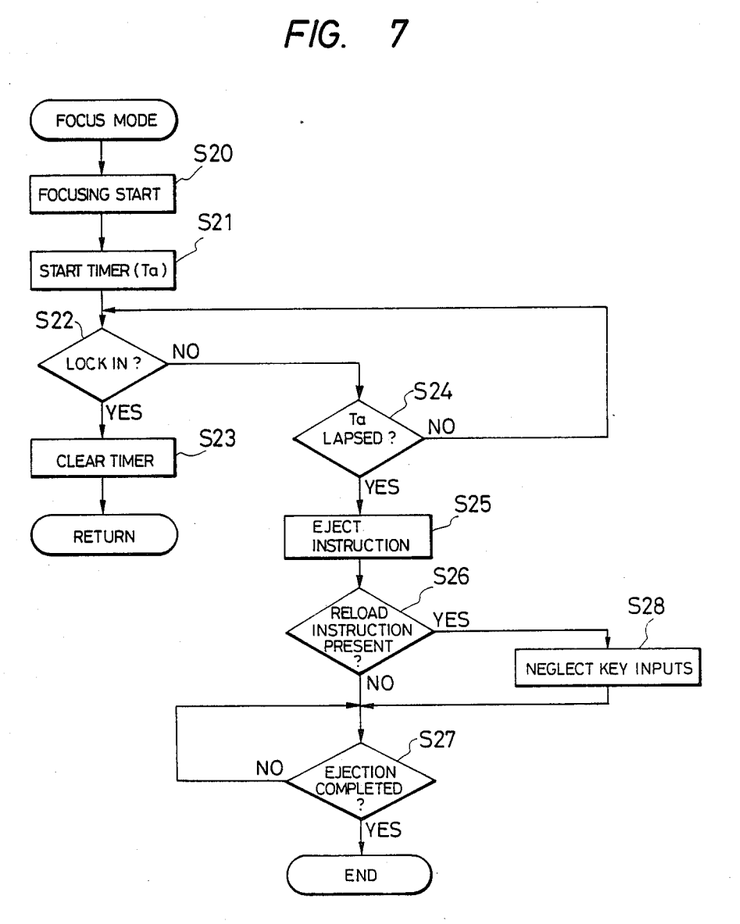

Subsequently, referring to a flowchart of FIG. 7, the focus mode (STEP 4) will be described.

The CPU 20 gives instructions to the focus servo circuit 28 for starting the focusing operation first (STEP 20) and simultaneously starts a timer set at fixed time $T_a$ (STEP 21). The timer is contained in the CPU 20. The CPU 20 then sees if the focus servo has locked in (STEP 22) and clears the timer when it has locked in (STEP 23) and then returns to the main flow of FIG. 5. The judgment of whether or not the focus servo has locked in is made possible by the use of the lock-in signal produced by the focus servo circuit 28 when the focus servo has locked in.

When it is so judged in STEP 22 that the focus servo has not been locked in, the CPU 20 judges whether the fixed time T has elapsed (STEP 24) and, if the result is positive, gives the eject instructions to the loading motor 7 through the motor drive circuit 30 so that the disk loaded in the playback position may be ejected (STEP 25). More specifically, the disk is ejected after the passage of the fixed time T in the case when the focus has not been achieved because the disk is scratched, unclean or inserted upside down.

After the eject instructions are given, the CPU 20 examines whether the reload instructions have been given through the operation of the group of operating keys 5 (STEP 26). When the reload instructions have not been given, the CPU 20 detects the completion of ejection (STEP 27), whereby the whole operation is stopped thereafter. When the reload instructions are considered present in STEP 26, the CPU 20 overrides the key input for giving the instructions (STEP 28) and then causes STEP 27 to be followed.

In other words, while the disk is being ejected without the focus being locked because the disk has been scratched, kept unclean or inserted upside down, the CPU 20 accepts no disk reload instructions and inhibits switching the eject operation over to the loading one. In consequence, the user is allowed to detect the fact that the disk has been inserted upside down and the disk having a scratch or being unclean is prevented from being replayed.

Figure 8:
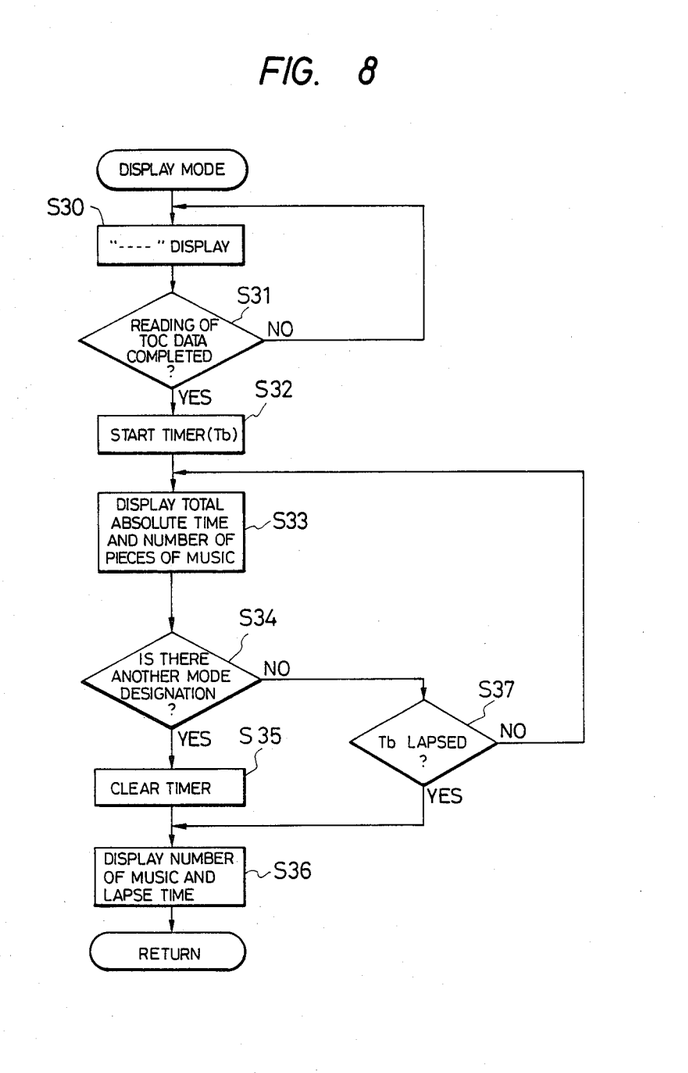

Referring to a flowchart of FIG. 8, the display mode (STEP 6) in FIG. 6 will be described.

Figure 5:
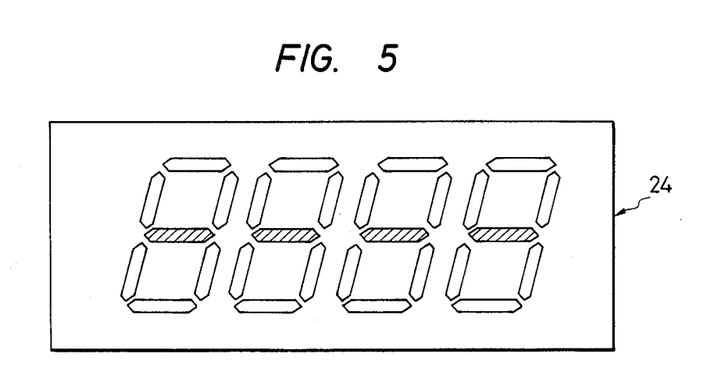
FIG. 5 is a diagram showing an example of a display method.
Figure 6:
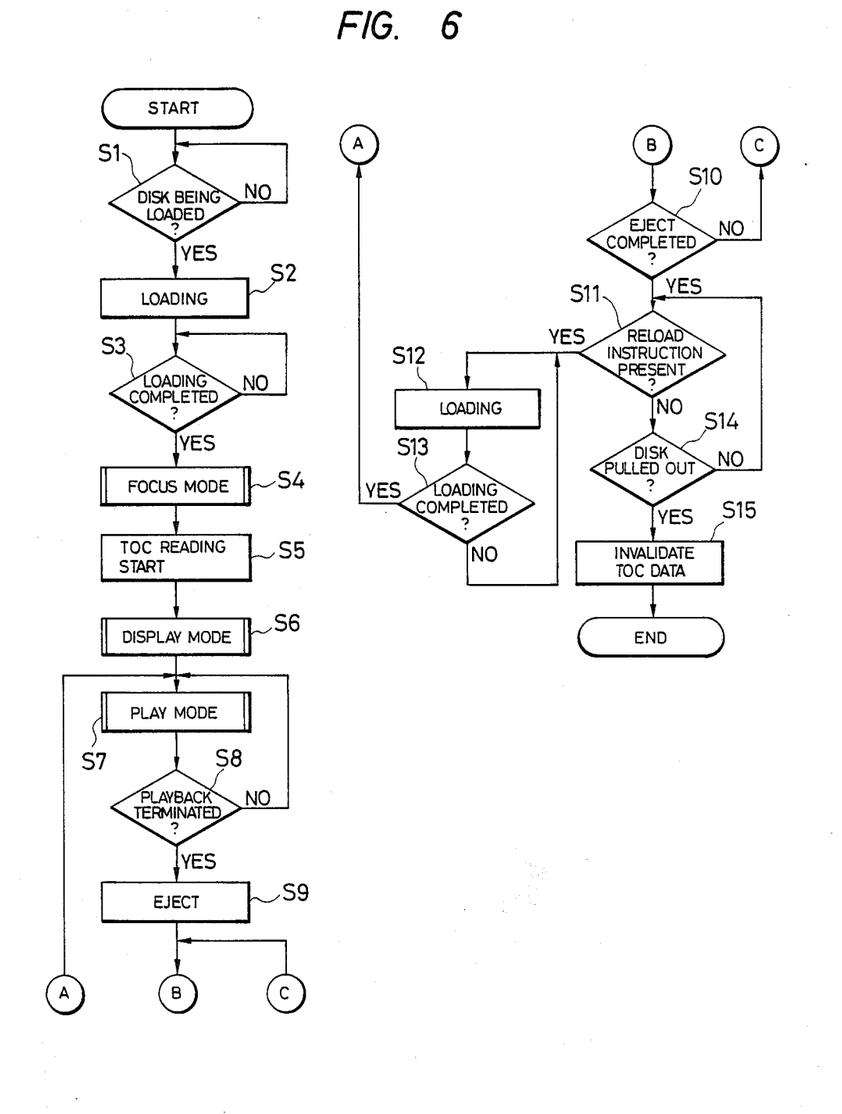
FIGS. 6 through 12 are flowcharts showing each operating procedure executed by the CPU.

The reading of the TOC data is started in the main flow of FIG. 6 (STEP 5) and then the display mode is established. That is, the desired data is displayed on the display 24 after the reading of the TOC data is started. For instance, one of the seven segments, i.e., the center horizontal segment, in each digit of the display 24 shown in FIG. 5 is used to blink a horizontal line [—] display (STEP 30). When the reading of the TOC data is completed (STEP 31), a timer set at fixed time T (e.g., 5 seconds) and contained in the CPU 20 is started (STEP 32). As a result, the TOC data thus read out, i.e., the number of pieces and the total absolute time are simultaneously displayed (STEP 33). In the flowchart of FIG. 6, the display and play modes are separately shown for the convenience of explanation. However, the display operation is started after the TOC data is read out in the display mode.

At the time of set-up wherein the TOC data is read out and the play operation is effected after the completion of disk loading, no TOC data has normally been read out yet and no data can be displayed on the display 24. Consequently, the user may be unable to know in which operating state the player is set. As set forth above, however, the user is informed of the set-up state of the player by some display even though the TOC data is unavailable. In this case, the display data is not limited to the horizontal line [—] caused to blink by the seven-segment display.

On detecting that the TRACK ±, FF or REV key of the group of operating keys 5 is pressed to specify another mode while the number of pieces and the total absolute time are being displayed (STEP 34), the CPU 20 clears the timer (STEP 35) and simultaneously causes playback situation data to be displayed according to the data read out from the pickup 14 regenerating the program area. The playback situation data include track numbers, the length of time (minutes, seconds) passed after the commencement of playback, etc. on a piece by piece basis (STEP 36). Those playback situation data have been recorded in the channel Q of the subcode signal in the so-called CD format and are detectable from the data read out through the pickup 14. On judging that, with no other mode specified, the state in which the number of pieces and the total absolute time are displayed has lapsed by the fixed time $T_b$ (STEP 37), STEP 36 is executed in which the display is switched over to that of the above playback situation data.

More specifically, the TOC data thus read out is displayed for the fixed time $T_B$ and, when some other mode is specified prior to the passage of the fixed time $T_B$, the display is immediately switched over to that of the playback situation data at that point of time. In any case, the display is automatically switched to that of the playback situation data after the passage of the fixed time T.

Figure 9:
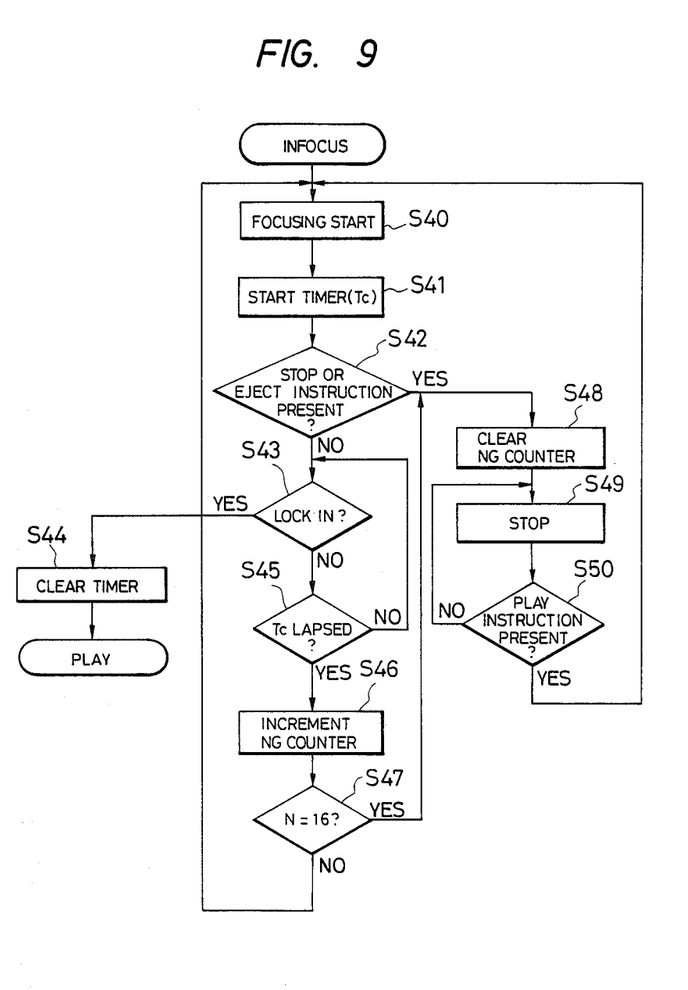

Referring to a flowchart of FIG. 9, further, a description will be given of a case where the pickup 14 is out of focus during play.

The CPU 20 always monitors the lock-in signal generated by the focus servo circuit 28 in the lock-in state of the servo loop with a fixed cycle. When the CPU 20 detects the disappearance of the lock-in signal, it determines that the pickup 14 has been brought out of focus. Thereafter, it starts the timer contained therein set at fixed time $T_c$ (STEP 41) after giving instructions for starting the focusing operation to the focus servo circuit 28 (STEP 40). The CPU 20 sees whether or not the disk eject or stop instructions are given through the key input of the group of operating keys 5 (STEP 42) and, provided the instructions are non-existent, judges whether or not the focus servo has been locked in (STEP 43). When the focus servo has been locked in, i.e., the focus has been achieved, the timer is cleared (STEP 44) and then the play operation is resumed. In case the servo focus lock-in signal is unavailable within the fixed time $T_c$ (STEP 45), it is then determined that the focus has not been achieved during the focusing operation (NG focus) and simultaneously the NG counter contained in the CPU 20 is incremented (STEP 46). The CPU 20 sees if the value N counted by the counter has become equal to a fixed value, e.g., 16 (STEP 47). When $N \neq 16$, the CPU 20 causes the operation to return to STEP 40 to provide the focusing operation again up to 16 times continuously and repeatedly until the focus is achieved.

When the focus is not achieved even though the focusing operation is continuously and repeatedly conducted, the CPU 20 clears the NG counter (STEP 48) and then returns to the stop state (STEP 49). The stop state means that the main power supply is cut off, causing the operation of each mechanism to stop, while the disk is in the playback position. In this stop state, when the CPU 20 detects the play instructions given through the operation of the group of operating keys 5 (STEP 50), the operation proceeds to STEP 40 to restart the focusing operation.

Thus, by limiting the repetition of the focusing operation, the load applied to the servo system including the focus actuator can be reduced and the pickup 14 is prevented from heating.

When the disk eject or stop instructions are issued during the focusing operation (STEP 42), the CPU 20 causes the operation to move to STEP 48 to clear the NG counter, which is then kept in the stop state. In the presence of the disk eject instructions, the operations is moved to the disk eject operation via the stop state. In the presence of the aforesaid eject or stop instructions, the stop state may be transferred to the play operation by clearing the NG counter to allow the focusing operation to be conducted again. Furthermore the focusing operation can be repeated continuously up to 16 times until the focus is achieved.

Figure 10:
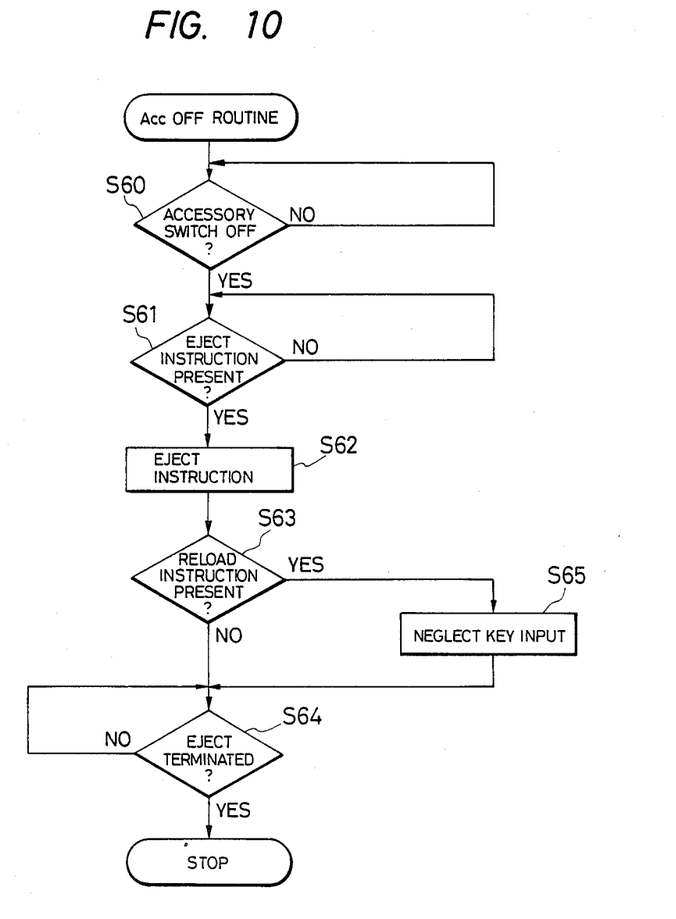

Referring to FIG. 10, a further description will be given of a case representing a special operation where the accessory switch of an automobile is turned off during the play operation.

The CPU 20 periodically at a fixed cycle monitors the output of the Acc detection circuit 31 and, when it detects that the main power supply (Acc) is cut off through the output thus detected (STEP 60), judges whether or not the eject instructions have been given through the operation of the group of operation keys 5 (STEP 61). When the eject instructions are determined to have been given, the CPU issues the eject instructions to the loading motor 7 through the motor drive circuit 30 to eject the disk located in the playback position (STEP 62). After the eject instructions are given, the CPU 20 judges the presence of the reload instructions through the operation of the group of operating keys 5 (STEP 63). When the reload instructions have not been issued, it detects the completion of ejection (STEP 64), whereby the whole operation is kept in the stop state thereafter. Moreover, when the reload instructions are judged present in STEP 63, the CPU 20 ignores the instructions involved through its key input (STEP 65) and allows the operation to move to STEP 64. The stop state is escaped by turning on the main power, whereafter the continuous periodic sampling of STEP 60 is repeated.

In other words, the CPU 20 accepts no disk reload instructions while the disk is ejected because the main power supply has been cut off and prohibits that the eject operation is switched over to the loading one. Consequently, the loading and ejection operations are prevented from being repeated and the battery voltage from being reduced.

With respect to the group of operating keys 5, there will subsequently be given a description of a case where the key operating method implemented by the CPU 20 when VOLUME [UP] and [DOWN] keys 50 and 51 and BALANCE [L] and [R] keys 52 and 53 are operated. The VOLUME [UP] and [DOWN] keys 50 and 51 function, as set forth above, to respectively give instructions as to increasing and decreasing sound volume. When both the keys are pressed (i.e., simultaneously pressed), they function to give instructions as to reducing the sound volume by, e.g., 20 dB at a time. By reference to a flowchart of FIG. 11, the method of operating the double press (two keys simultaneously pressed) keys will be described as follows.

Figure 11:
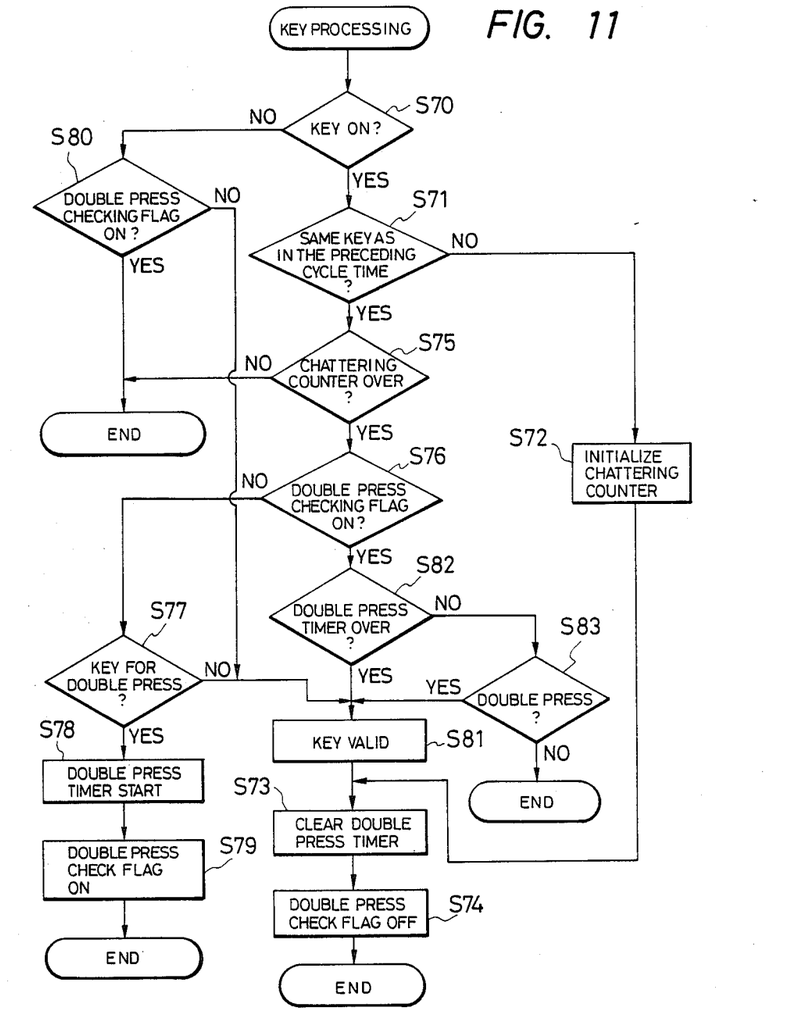

The CPU 20 is normally used to detect with sampling at a fixed period which one of the group of operating keys 5 is pressed (STEP 70). When one of the keys 5 is pressed, the CPU 20 judges whether or not the key 5 thus newly pressed is the same as what has been pressed in the preceding cycle time (STEP 71). When the key thus newly pressed is found different from what has been previously pressed, the CPU 20 initializes a chattering counter contained therein (STEP 72) and subsequently clears a double press timer (STEP 73) and further turns off a double press checking flag (STEP 74). The chattering counter is used to compensate for chattering at the time of key operation and to prevent the malfunction of the key. The double press timer is employed to monitor whether or not any one of the keys pressed is the second one of the double press keys. The double press checking flag is used to indicate that the first key involved is a first one of the double press keys.

When any pressed key is found in STEP 71 to be the same as what has been pressed previously, the CPU 20 sees whether the chattering counter has counted above a predetermined number (STEP 75) and, if the extra count exists, judges whether or not the double check flag is held on (STEP 76). The answer is NO since, in the preceding cycle, the double press check flag has been turned off in STEP 74. Therefore, the CPU 20 judges whether or not the key thus pressed is a double press key (STEP 77). When it is one of the double press key, the CPU 20 starts the double press timer (STEP 78) and further turns on the double press check flag (STEP 79).

When one of the two double press keys is pressed, the double press timer is started. During the time the double press timer is operated, the CPU 20 confirms in STEP 80 that the double press check flag is held on when it determines in STEP 70 that the key has not been pressed, i.e., the key has been turned off. If the double press check flag is held on, the CPU 20 thereafter validates the key (STEP 81). By validating a key is meant issuing a command corresponding to that key.

During the operation of the double press timer, the CPU 20 sees whether the timer involved has counted above a predetermined time through STEP 76 and STEP 82. If the number counted is excessive (time expired), the CPU 20, validates the one double press key pressed at that point of time (STEP 81). Moreover, the CPU 20 checks in STEP 83 whether or not both double press keys have been pressed when there in no excessive count in STEP 82. Provided the both the double press keys have been pressed, the CPU 20 causes the operation to move to STEP 81 while accepting the double press by validating both the double press keys.

More specifically, the CPU 20 operates the double press timer when a double press key is pressed and, during the operation of the timer, accepts one of the two double press keys by detecting the key has not been pressed. Further, when both keys are pressed, accepts them as those pressed doubly. In addition, when one of the keys is pressed at the point of time after the period of the operation of the double timer, the CPU 20 performs the process of accepting the single key. After accepting each key, the CPU 20 supplies the data and the clock signal to the electronic volume 27 (see FIG. 4) so as to effect the function of each key or of the double press function for both keys.

Since the operation of one key can be processed during the operation of the double press timer by detecting that one of the keys is pressed and released during the operation thereof, the operation of any key repeated fast can readily be dealt with.

Although a description has been given of a case where the volume [UP], [DOWN] keys 50 and 51 are employed for the method of processing the operation of the double press key, the present invention is not limited to the use of those keys and the disk player as what is applicable thereto.

Referring to a flowchart of FIG. 1, a description will be given further of the method of regulating the sound volume balance between the left and right channels by means of the balance [L] and [R] keys 52 and 53.

Figure 12:
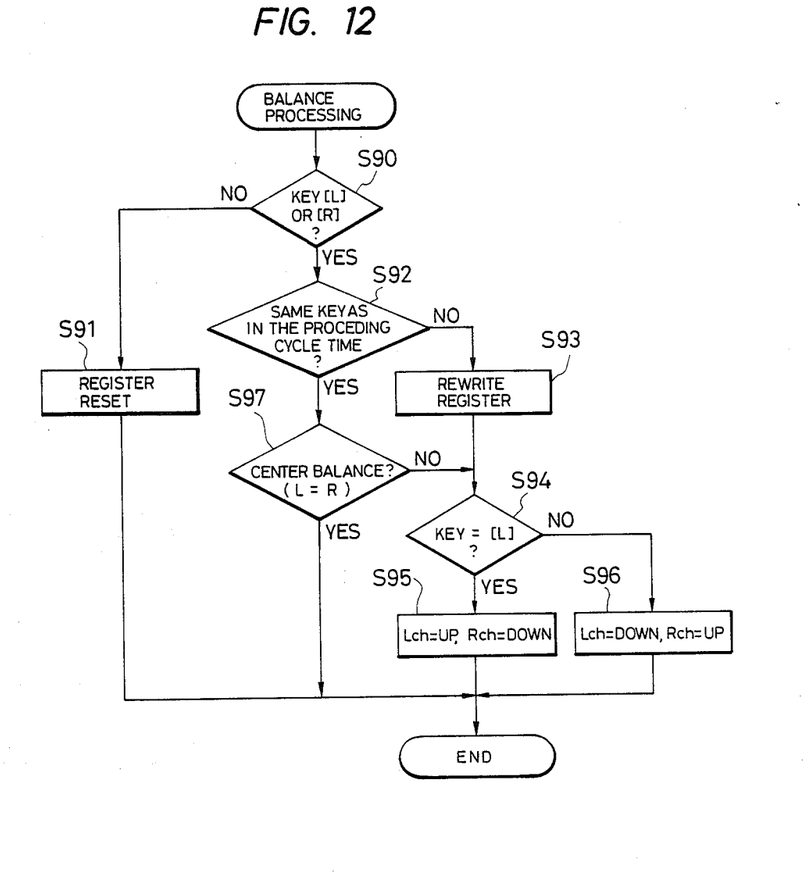

The CPU 20 periodically monitors at a fixed cycle which one of the group of operating keys 5 has been pressed and, when one of them is pressed, checks whether the key thus pressed is the balance [L] key 52 or [R] key 53 (STEP 90). When either key is pressed, key discriminating data corresponding to the key is stored in a register contained in the CPU 20. The register is reset (STEP 91) provided the key thus pressed is not the balance [L] 52 nor [R] 53 key and then the subsequent cycle is waited for.

When it is judged that the balance [L] key 52 or [R] key 53 has been pressed in STEP 90, the key discriminating data last stored in the register and another key discriminating stored therein this time are compared. Thereby it is judged whether or not the key is the same as in the preceding cycle (STEP 92). Based on the aforesaid judgment, the CPU 20 can determined whether the same key has been pressed consecutively. When the key is not consecutively pressed, the CPU 20 rewrites the key discriminating data stored in the register (STEP 93) and subsequently checks whether or not the key is the balance [L] key 52 (STEP 94). When it is the balance key [L] 52, the CPU 20 sends the data and the clock signal to the electronic volume control 27 (FIG. 4) to increase the sound volume in the left channel L and to decrease the sound volume in the right channel R (STEP 95), whereas it exercises control in the reverse direction when the balance key [R] 53 is involved (STEP 96).

When the key is judged to be consecutively pressed in STEP 92, the CPU 20 checks whether or not the sound is balanced between both the left and right channels (center balance state) (STEP 97), and causes the operation to move to STEP 94 if there is an imbalance and further stops accepting the double press operation at the point of time the balance is regained. The center-balanced state is detectable by comparing the data in the left and right channels sent to the electronic volume circuit 27 and seeing that both the data conform to each other.

When the center-balance is thus gained while the balance key is continuously pressed, the CPU 20 stops accepting the continuous press operation at that point of time and the so-called center click effect is obtained, whereby it is ensured that the center-balance state is obtained simply. Thereby operation without a glimpse at the display becomes possible. In particular, the disk player is of use as a vehicular one often operated without the necessity of confirming the display.

Although a description has been given of the method of processing the aforesaid sound volume applied to the electronic volume circuit in the disk player in the above embodiment, the present invention is needless to say not limited to the aforesaid embodiment but applicable to an ordinary tone control circuit, a feeder control circuit, etc.

As set forth above, since the stop mode is effected when the focus is not taken even though the focusing operation is repeated the desired number of times in the vehicular disk player according to the present invention, the load applied to the servo system can be reduced and the pickup is also prevented from heating.

Moreover, by clearing the value counted by the counter used to count the number of times the focus is taken when the disk eject or stop instructions are issued during the focusing operation, the focusing operation can repeat continuously for the aforesaid desired number of times always even when the focusing operation is carried out again thereafter.

What is claimed is:

1. A vehicular disk player comprising;
an optical pickup for reading out data recorded on a disk;
a focus servo circuit for controlling a focusing operation of said pickup and producing a lock-in signal at the time of lock-in of said servo circuit, during playback;
means for monitoring said lock-in signal during a playback of said disk including reading out said data to thereby detect said pickup being brought out of focus;
means for commencing repeated ones of said focusing operations:
first means for detecting that said lock-in signal is not produced within a fixed time after the commencement of one said repeated focusing operations and for producing a detection signal therefor; and
a counter for counting the number of times said detection signal is produced, whereby a stop mode is established when what is counted by said counter reaches a predetermined value, said focusing operation being repeated when said detection signal has been produced unless said counter has reached said predetermined value.

2. A vehicular disk player as claimed in claim 1, further comprising second means for detecting disk instructions when said instructions are issued during said repeated focusing operations and clearing said number counted by said counter.

3. A vehicular disk player as claimed in claim 1, further comprising second means for detecting stop instructions when said stop instructions are issued during said repeated focusing operation and clearing the number counted by said counter.

4. A vehicular disk player as claimed in claim 2, wherein said second detecting means are operable only before an operation of said first detecting means and after a production of said detection signal.

5. A vehicular disk player as claimed in claim 1, wherein said means for commencing repeated ones of said focusing operations is responsive to a disappearance of said lock-in signal.

* * * * *